(12) United States Patent
Kwon

(10) Patent No.: US 11,277,284 B2
(45) Date of Patent: Mar. 15, 2022

(54) PDP ESTIMATION FOR BUNDLE-BASED CHANNEL ESTIMATION VIA LEARNING APPROACH

(71) Applicant: Samsung Electronics Co., Ltd., Suwon-si (KR)

(72) Inventor: Hyuk Joon Kwon, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 5 days.

(21) Appl. No.: 17/011,741

(22) Filed: Sep. 3, 2020

(65) Prior Publication Data

US 2021/0314198 A1 Oct. 7, 2021

Related U.S. Application Data

(60) Provisional application No. 63/024,196, filed on May 13, 2020, provisional application No. 63/004,918, filed on Apr. 3, 2020.

(51) Int. Cl.
*H04L 25/02* (2006.01)

(52) U.S. Cl.
CPC ...... *H04L 25/0254* (2013.01); *H04L 25/0224* (2013.01)

(58) Field of Classification Search
CPC .................................................. H04L 25/0224
See application file for complete search history.

(56) References Cited

U.S. PATENT DOCUMENTS

| | | | |
|---|---|---|---|
| 2010/0217145 | A1 | 8/2010 | Buscema |
| 2013/0182746 | A1 | 7/2013 | Panicker et al. |
| 2014/0022988 | A1 | 1/2014 | Davydov et al. |
| 2014/0254534 | A1 | 9/2014 | Zhang |
| 2015/0229493 | A1 | 8/2015 | Lee et al. |
| 2016/0211943 | A1 | 7/2016 | Jung et al. |
| 2016/0337105 | A1* | 11/2016 | Lawton ................ H04L 1/0026 |
| 2018/0309599 | A1 | 10/2018 | Lee |
| 2019/0097843 | A1* | 3/2019 | Obara ................ H04L 25/0228 |

OTHER PUBLICATIONS

S. Levine, "Policy Gradients, UC Berkeley, CS294-112." [Online], Available: http://rail.eecs.berkeley.edu/deeprlcourse-fa18/, 12 pages.

(Continued)

*Primary Examiner* — Kabir A Timory
(74) *Attorney, Agent, or Firm* — Lewis Roca Rothgerber Christie LLP

(57) ABSTRACT

A method of channel estimation for a precoded channel includes generating an initial frequency autocorrelation of the precoded channel for a current bundle of a received data transmission, generating an expanded frequency autocorrelation based on the initial frequency autocorrelation of the precoded channel, providing the expanded frequency autocorrelation to a neural network, generating, by the neural network, an estimated frequency autocorrelation of an unprecoded channel based on the expanded frequency autocorrelation, and generating an estimated power distribution profile of the unprecoded channel based on the estimated frequency autocorrelation.

20 Claims, 15 Drawing Sheets

(56) References Cited

OTHER PUBLICATIONS

T. Cui and C. Tellambura, "Power delay profile and noise variance estimation for ofdm" IEEE Communications Letters, vol. 10, No. 1, pp. 25-27, Jan. 2006.

X. Gong, C. Zhao, W. Xu, and M. Jiang, "Power Delay Profile estimation for MIMO-OFDM systems overtime-varying multipath channels," in 2010 IEEE 12th International Conference on Communication Technology, Nov. 2010, pp. 1003-1006.

Y.-J. Kim and G.-H. Im, "Pilot-symbol assisted power delay profile estimation for MIMO-OFDM systems," IEEE communications letters, vol. 16, No. 1, pp. 68-71, Jan. 2012.

R. Salakhutdinov, "Deep Reinforcement Learning and Control, CMU CS10703", (2014-2016) 31 pages.

3GPP, "R1-1612661," 3rd Generation Partnership Project (3G PP), Technical document, 11 2016, rAN1#8 7, 9 pages.

3GPP, "Technical Specification Group Radio Access Network; NR; Physical layer procedures for data (Release 15)," 3rd Generation Partnership Project (3G PP), Technical Specification (TS) 38.214, 03 2019, version 15 .5.2, 103 pages.

\* cited by examiner

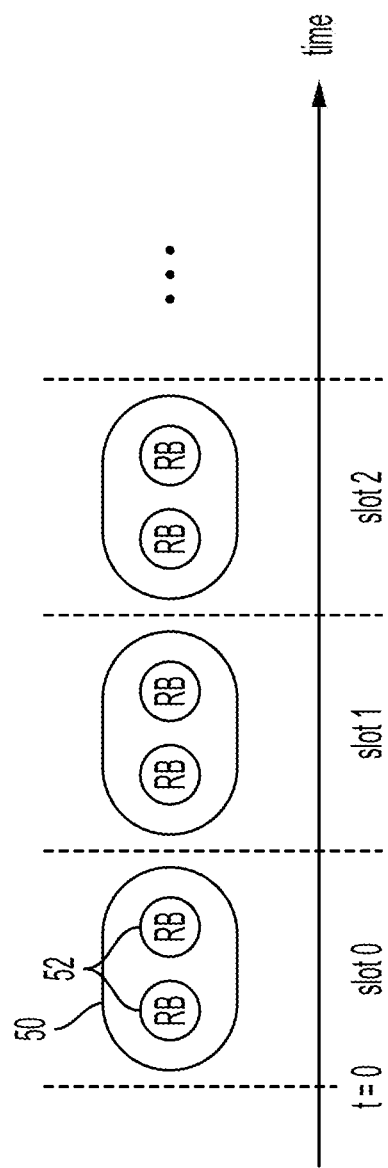

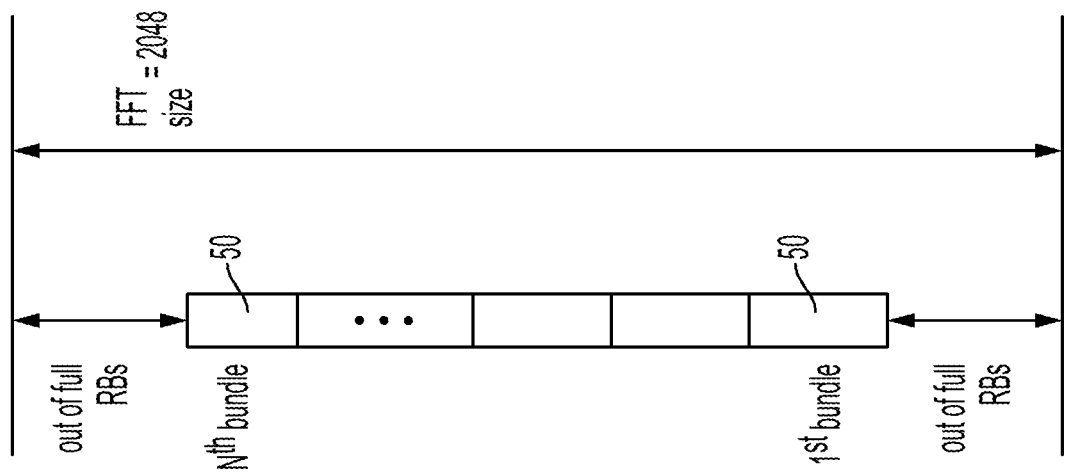

PDP ESTIMATION FOR BUNDLE-BASED CHANNEL ESTIMATION VIA LEARNING APPROACH

CROSS-REFERENCE TO RELATED APPLICATION(S)

This application claims priority to, and the benefit of, U.S. Provisional Application No. 63/004,918 ("PDP ESTIMATION FOR BUNDLE-BASED CHANNEL ESTIMATION VIA REINFORCEMENT LEARNING WITH ACTOR-CRITIC APPROACH"), filed on Apr. 3, 2020, and U.S. Provisional Application No. 63/024,196 ("PDP ESTIMATION FOR BUNDLE-BASED CHANNEL ESTIMATION VIA SUPERVISED LEARNING"), filed on May 13, 2020, the entire contents of which are incorporated herein by reference.

FIELD

Aspects of the present disclosure relate to communication channel estimation.

BACKGROUND

The physical downlink shared channel (PDSCH) is a physical channel that is generally used to carry user data, dedicated control and user-specific higher layer information and downlink system information. The resource blocks (RBs) for PDSCH may be allocated in bundles of two or more RBs. Resource blocks within a bundle may be precoded in the same manner and other resource blocks mapped to different bundles may be independently precoded based on the decision by the radio node (e.g., a 5G logical radio node, i.e., gNB).

Under a recent specification released by the 3rd Generation Partnership Project (3GPP), there are two scenarios for resource allocation for PDSCH, namely, precoding all bundles (with the same or different precoding) or not precoding at all. The latter is equivalent to the identical precoding across all bundles. A user equipment (UE) can take advantage of this configuration to improve the channel estimation. When the same precoding is applied to all bundles, a frequency domain signal is homogeneous in terms of the precoding so that it can be converted to a time domain by taking inverse fast fourier transform (IFFT). This means that the denoising in a time domain can be utilized based on the user equipment's estimated power delay profile (PDP), which recursively provides an advantage to estimate PDP for the next time/frequency slot as measuring channel powers with infinite impulse response (IIR) filters.

However, this approach is not applicable when each bundle is independently precoded with its own selection, as the user equipment is not aware of the radio node's precoding selection at each bundle. The time domain conversion through IFFT is not feasible since the effective channels combined with the precoding are no longer homogeneous across bundles. The user equipment then has to estimate channels based on the information in the frequency domain.

The above information disclosed in this Background section is only for enhancement of understanding of the background of the disclosure and therefore it may contain information that does not constitute prior art.

SUMMARY

Aspects of example embodiments of the present disclosure are directed to a system and a method for performing channel estimation by utilizing a neural network (e.g., a deep-learning neural network). According to some embodiments, the neural network is trained with samples having precoded channel correlation with labels of unprecoded channel correlation, and can thus convert channel correlation to be homogeneous. In some embodiments, the channel estimator performs post-processing on the output of the neural network to further refine the estimation and allow it to be denoised in the time domain via inverse fast fourier transform (IFFT). This allows the channel estimator to estimate channel correlation in the frequency domain even when random precoding is configured across bundles.

According to some embodiments of the present disclosure, there is provided a method of channel estimation for a precoded channel, the method including: generating an initial frequency autocorrelation of the precoded channel for a current bundle of a received data transmission; generating an expanded frequency autocorrelation based on the initial frequency autocorrelation of the precoded channel; providing the expanded frequency autocorrelation to a neural network; generating, by the neural network, an estimated frequency autocorrelation of an unprecoded channel based on the expanded frequency autocorrelation; and generating an estimated power distribution profile of the unprecoded channel based on the estimated frequency autocorrelation.

In some embodiments, the current bundle includes a plurality of resource blocks, each one of the resource blocks including a plurality of subcarriers.

In some embodiments, the unprecoded channel is an estimate of the precoded channel absent precoding.

In some embodiments, the generating the expanded frequency autocorrelation includes: performing edge expansion on the initial frequency autocorrelation to expand a size of the estimate frequency autocorrelation to a fast fourier transform (FFT) size, wherein the FFT size is an input size of the neural network.

In some embodiments, the edge expansion includes a linear interpolation of values of the initial frequency autocorrelation via an expansion matrix.

In some embodiments, the providing the expanded frequency autocorrelation to the neural network includes: providing a first half of values of the expanded frequency autocorrelation to the neural network, wherein a second half of values of the expanded frequency autocorrelation are complex conjugates of the first half of values of the expanded frequency autocorrelation.

In some embodiments, the generating the estimated frequency autocorrelation by the neural network includes: generating, by the neural network, a first half of values of the estimated frequency autocorrelation of the unprecoded channel based on the expanded frequency autocorrelation; and calculating a second half of values of values of the estimated frequency autocorrelation of the unprecoded channel as a complex conjugate of the first half of values.

In some embodiments, the generating the estimated power distribution profile includes: filtering the estimated frequency autocorrelation output by the neural network via a low pass filter to generate a refined autocorrelation of the unprecoded channel; and performing an inverse FFT (IFFT) operation on the refined autocorrelation to generate the estimated power distribution profile.

In some embodiments, the low pass filter is a moving average filter.

In some embodiments, the generating the initial frequency autocorrelation of the precoded channel for the current bundle includes: generating a time autocorrelation for a previous bundle of the received data transmission; generating a previous frequency autocorrelation for the previous bundle based on a previous estimated power distribution profile; generating an estimated channel input response based on the time autocorrelation and the previous frequency autocorrelation; and generating the initial frequency autocorrelation of the precoded channel for the current bundle based on the estimated channel input response.

In some embodiments, the method further includes: generating a truncated estimated power distribution profile by truncating a size of the estimated power distribution profile to match a size of the initial frequency autocorrelation of the precoded channel.

In some embodiments, the method further includes: normalizing the truncated estimated power distribution profile to a unit power to generate a normalized estimated power distribution profile.

In some embodiments, the truncated estimated power distribution profile has a length of a maximum delay spread of the precoded channel.

According to some embodiments of the present disclosure, there is provided a system for channel estimation of a precoded channel, the system including: a processor; and memory storing instructions that, when executed on the processor, cause the processor to perform: generating an initial frequency autocorrelation of the precoded channel for a current bundle of a received data transmission; generating an expanded frequency autocorrelation based on the initial frequency autocorrelation of the precoded channel; providing the expanded frequency autocorrelation to a neural network; generating, by the neural network, an estimated frequency autocorrelation of an unprecoded channel based on the expanded frequency autocorrelation; and generating an estimated power distribution profile of the unprecoded channel based on the estimated frequency autocorrelation.

According to some embodiments of the present disclosure, there is provided a method of channel estimation of a precoded channel, the method including: generating an initial frequency autocorrelation of the precoded channel for a current bundle of a received data transmission; providing the initial frequency autocorrelation to a policy network; generating, by the policy network, an estimated frequency autocorrelation of an unprecoded channel based on the initial frequency autocorrelation; determining, by a value network, an instantaneous reward based on the estimated frequency autocorrelation; determining an advantage based on the instantaneous reward and a predicted total reward of forward propagation at the value network; and updating a policy of the policy network based on the advantage via back propagation to reduce a block error rate.

In some embodiments, the updating the policy of the policy network includes: determining a policy gradient based on the advantage; and updating coefficients of the policy network based on the policy gradient.

In some embodiments, the policy network and the value network are multi-layer perceptrons.

In some embodiments, the method further includes: adding gaussian noise to the estimated frequency autocorrelation to convert a discrete action space of the policy network to a continuous action space.

In some embodiments, the method further includes: generating an expanded frequency autocorrelation based on the initial frequency autocorrelation of the precoded channel, wherein the providing the initial frequency autocorrelation to the policy network includes: providing the expanded frequency autocorrelation to the policy network, and wherein the generating the estimated frequency autocorrelation of the unprecoded channel is based on the expanded frequency autocorrelation.

In some embodiments, the method further includes: filtering the estimated frequency autocorrelation via a low pass filter to generate a refined autocorrelation of the unprecoded channel; and performing an inverse FFT (IFFT) operation on the refined autocorrelation to generate an estimated power distribution profile.

BRIEF DESCRIPTION OF THE DRAWINGS

These and other features of some example embodiments of the present disclosure will be appreciated and understood with reference to the specification, claims, and appended drawings, wherein:

FIG. 2A illustrates the mapping of bundles to time slots at the receiver, according to some examples;

FIG. 2B illustrates bundle allocation over frequency over a radio at a receiver of the communication system, according to some embodiments of the present disclosure.

DETAILED DESCRIPTION

The detailed description set forth below in connection with the appended drawings is intended as a description of some example embodiments of a system and a method for channel estimation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Recent generations of technology standards for communication networks support bundle-based configurations in which each bundle may be precoded with its own selection from the precoding matrix. To facilitate communication in such a system, the user equipment (UE) has to estimate channels (e.g., estimate the power delay profile (PDP) of the channel) in the frequency domain. One channel estimation technique, minimum mean squared error (MMSE), utilizes a channel's $2^{nd}$ order statistics consisting of frequency and time correlations (e.g., frequency and time autocorrelations). Time correlation (e.g., time autocorrelation) may be determined based on known techniques. However, frequency correlation (e.g., frequency autocorrelation) involves accurate estimation of PDP information. Assuming uniform PDP when deriving frequency correlation may result in performance degradation, especially when channel delay is relatively long.

Thus, the channel estimator, according to some embodiments, utilizes a neural network that receives frequency correlation of a precoded channel from a preceding slot/bundle and outputs the PDP information of a current slot/bundle. In some embodiments, the channel estimator further performs filtering, truncation, and normalization to refine the output of the neural network, which is utilized to estimate the channel for the current bundle/slot.

Figure 1:
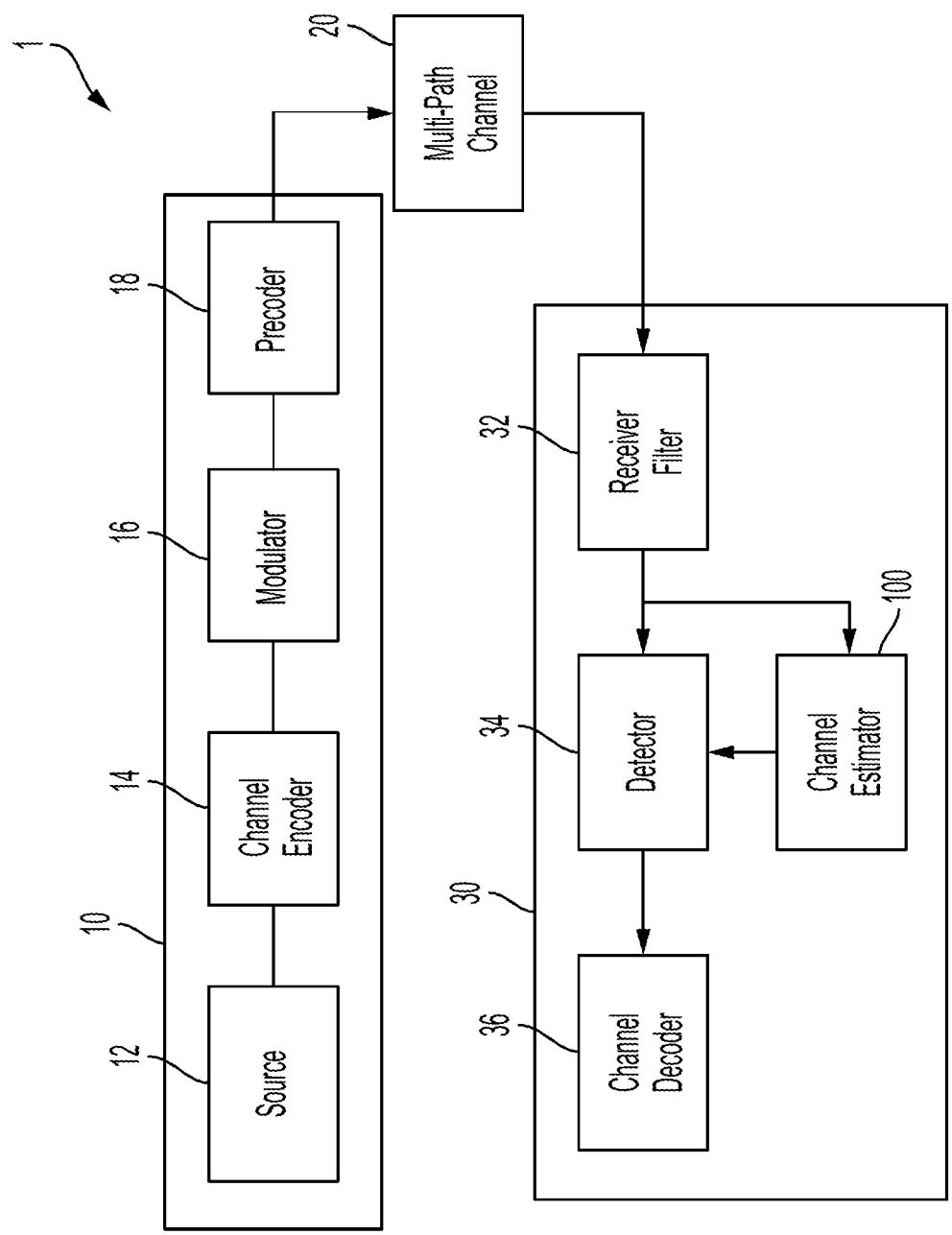
FIG. 1 is a block diagram of a communication system utilizing the channel estimator, according to some embodiments of the present disclosure.

FIG. 1 is a block diagram of a communication system 1 utilizing the channel estimator 100, according to some embodiments of the present disclosure.

The communication system 1 may include a transmitter 10, a communication channel (e.g., a wireless multi-path channel) 20, and a receiver 30. The transmitter 10 may include a source 12 of input data, a channel encoder 14 configured to encode the input data to enable error correction at the receiver 30, a modulator 14 configured to generate a transmit signal based on the encoded input data, and a precoder 18 for precoding one or more bundles of data prior to transmission through the communication channel 20.

The receiver 30 includes a receiver filter 32 for filtering out noise that may have been added to the transmitted signal in the multi-path channel 20, a detector 34 configured to reconstruct the encoded data from the received signal, and a channel decoder 36 configured to decode the reconstructed data to retrieve the input data generated by the source 12.

The transmitter 10 may be a radio node, and the receiver 30 may be part of the user equipment, which may be mobile. The communication channel 20 may not be constant and may change over time, for example, as a result of the transmitter 10 and/or the receiver 30 being in motion. Mobile wireless communication may be adversely affected by the multi-path interference resulting from reflections from surroundings, such as hills, buildings, and other obstacles. Having an accurate estimate of the time-varying channel is key to providing reliability and high data rates at the receiver 30. Thus, according to some embodiments, the receiver 30 further includes a channel estimator 100 that utilizes a neural network to estimate the channel, that is, the channel impulse response (CIR), for each bundle of transmitted signal and provides the CIR to the detector 34.

The signal y received by the receiver 30 may be expressed as:

$$y = p + n \quad \text{(Eq. 1)}$$

where p is a reference signal (RS) channel vector of demodulation reference signals (DMRS) and n is a background noise, which has a zero-mean and covariance of $\sigma^2 I$ (where I is an identity matrix). The estimate of channel input response $\hat{h}$ may be expressed as:

$$\hat{h} = R_{hp}(R_{pp} + \sigma^2 I)^{-1} y \quad \text{(Eq. 2)}$$

where $R_{hp}$ represents the correlation matrix between h and p. Similarly, $R_{pp}$ denotes the auto-correlation matrix of p. The auto-correlation $R_{pp}$ may be solely a function of p, which is a DMRS channel vector known to the receiver 30.

Here, it is assumed that the channel distribution follows a wide-sense stationary uncorrelated scattering (WSSUS) model. In other words, the second-order moment of the channel is stationary and only depends on the amount of either time or frequency difference, instead of each instantaneous value. Under the WSSUS model, the channel autocorrelation can be decomposed into a frequency domain part and a time domain part as:

$$R_{h_{i,j},h_{k,l}} = r_f(i-k) r_t(j-l) \quad \text{(Eq. 3)}$$

Where $h_{i,j}$ is the complex channel gain at the ith subcarrier of the jth symbol, and $r_f(\ )$ and $r_t(\ )$ are frequency and time autocorrelation functions, respectively. Appropriate selection of the subcarrier numbers i and k and the symbol values j and l allows for the calculation of the $R_{hp}$ and $R_{pp}$ based on $R_{h_{i,j},h_{k,l}}$.

The time autocorrelation function $r_t(\ )$ may be calculated in a number of ways. For example, the time autocorrelation function may rely on linear interpolation to get the correlation value between two symbols, which is given by $$r_t(l) = 1 - \frac{TC(T_{corr})}{T_{corr}} l T_s \quad \text{(Eq. 4)}$$

where TC(x) is the correlation value of interval x, and $T_s$ represents the symbol duration. In other examples, Jakes' model may be used to yield:

$$r_t(l) = J_0(2\pi T_s f_D l) \quad \text{(Eq. 5)}$$

Where $J_0$ is the first kind zero-th order Bessel function, $f_D$ represents the Doppler spread corresponding to the largest Doppler shift.

Given the power delay profile (PDP) of the channel 20, the frequency autocorrelation function can be expressed with the fast fourier transform (FFT) of channel powers as $$r_f(k) = \sum_{i=0}^{L-1} P_i e^{-j2\pi k \Delta f \tau_i} \quad \text{(Eq. 6)}$$

where L is the number of channel taps (also referred to as a maximum delay spread) in the time domain and $\Delta f$ is the subcarrier spacing. $P_i$ and $\tau_i$ are the power and delay of the ith channel tap, respectively. The maximum delay spread L may be measured with a quasi-co-located (QCL) reference signal. Here, a total amount of power in the profile is normalized to be a unit power, i.e., $$\sum_{i=0}^{L-1} P_i = 1 \quad \text{(Eq. 7)}$$

According to some embodiments, the channel estimator 100 estimates the values $P_i$ (e.g., as close to ideal as possible) by utilizing a neural network. The PDP values may be used to determine the frequency autocorrelation function $r_f(\ )$ using Equation 6. The frequency autocorrelation function $r_f(\ )$ together with the time autocorrelation function $r_t(\ )$ (as, e.g., determined by Equation 4 or 5) the receiver 30 may determine the channel correlation matrix $R_{h,h}$ via Equation 3, from which the channel autocorrelations $R_{hp}$ and $R_{pp}$ can be calculated. The receiver 30 may then determine the estimated channel input response $\hat{h}$ via Equation 2. In some embodiments, the receiver 30 individually estimates the channel response for each bundle of a transmission.

FIG. 2A illustrates the mapping of bundles to time slots at the receiver 30, according to some examples. FIG. 2B illustrates bundle allocation over frequency over a radio (e.g., 5G New Radio (NR)) at the receiver 30, according to some embodiments of the present disclosure.

Referring to FIG. 2A, in some examples, each received bundle 50 includes a plurality of resource blocks/elements 52 (e.g., 2 or 4 RBs), and corresponds to a separate time slot at the receiver. Each bundle 50 may have a different precoding. Each resource block 52 may include a plurality of subcarriers (SCs). In some examples, each resource block 52 includes 12 subcarriers, and thus each bundle corresponds to 24 subcarriers.

Referring to FIG. 2B, a total of N bundles (N being an integer greater than 1) are allocated over frequency (as represented by a vertical axis), where the maximum number $N_{max}$ of resource blocks is determined based on both a subcarrier spacing and a channel bandwidth (CHBW). Table 1 tabulates the maximum number $N_{max}$ of resource blocks, for first frequency range (FR1). In the example of Table 1, the maximum number $N_{max}$ of resource blocks is highest (i.e., 273) at a channel bandwidth of 100 MHz and a subcarrier spacing of 30 kHz.

TABLE 1

| | CHBW (MHz) | | | | | | | | | |
|---|---|---|---|---|---|---|---|---|---|---|
| | 5 | 10 | 15 | 20 | 25 | 40 | 50 | 60 | 80 | 100 |
| 15 kHz | 25 | 52 | 79 | 106 | 133 | 216 | 270 | | | |
| 30 kHz | 11 | 24 | 38 | 51 | 65 | 106 | 133 | 162 | 217 | 273 |
| 60 kHz | | 11 | 18 | 24 | 31 | 51 | 65 | 79 | 107 | 135 |

As shown in FIG. 2B, the size of resource allocation ($1^{st}$ to $N^{th}$ bundles 50) are smaller than an entire FFT size (e.g., 2048), which is sized accommodate different channel bandwidth and subcarrier spacing combinations. As the receiver 30 may not be aware of the frequency resource allocation at the transmitter 10, in some embodiments, the receiver 30 is designed for a large FFT size and the input is expanded as when the resource allocation is less than the FFT size. That is, even though the receiver 30 uses the frequency autocorrelation for PDP estimation (which may be less than the FT size), embodiments of the present disclosure consider the region out of full RBs up to the entire FFT size.

In order to determine the PDP (which is a time domain characteristic) for each bundle of a transmission, according to some embodiments, the frequency correlation of the physical downlink shared channel (PDSCH; see, Equation 20 below) combined with DMRS in the previous slot is provided to a neural network. The output of frequency autocorrelation is post-processed to estimate PDP for the current slot. Accordingly, the channel estimator improves the block error rate (BLER) as compared to the related art, which assume for the channel to have a uniform PDP.

Figure 3A:
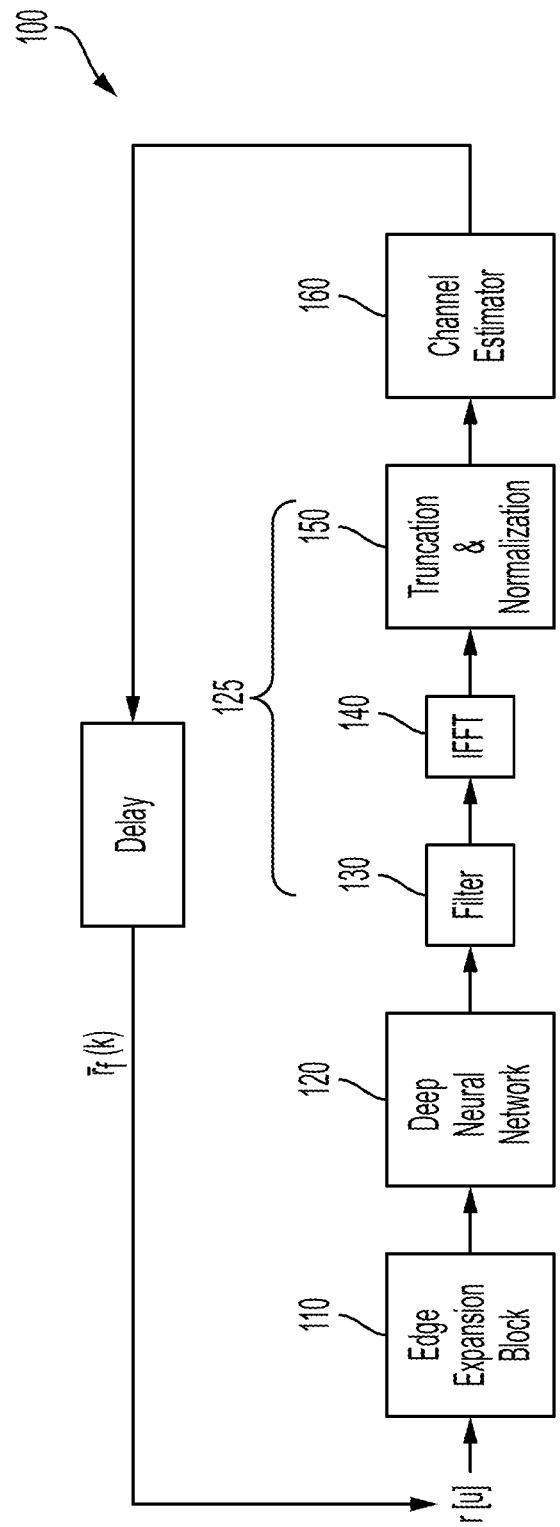
FIG. 3A is a block diagram of the channel estimator utilizing supervised learning, according to some embodiments of the present disclosure.
Figure 3B:
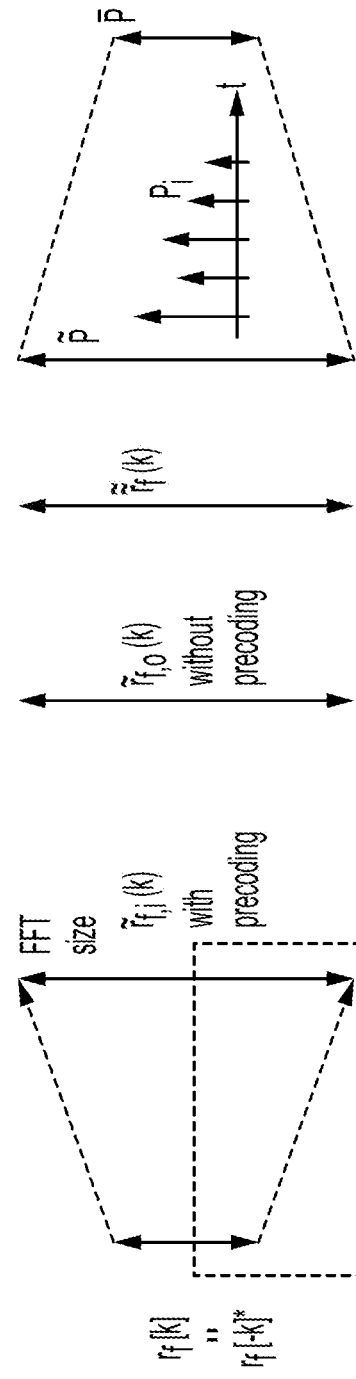
FIG. 3B illustrates the effect of various components of the channel estimator, according to some embodiments of the present disclosure.

FIG. 3A is a block diagram of the channel estimator 100 utilizing supervised learning, according to some embodiments of the present disclosure. FIG. 3B illustrates the effect of various components of the channel estimator 100, according to some embodiments of the present disclosure.

According to some embodiments, the channel estimator 100 includes an edge expander 110, a neural network 120, a post-processor 125, and a narrowband channel estimator (NBCE) 160. In some embodiments, the post-processor 125 includes a filter 130, an inverse fast fourier transform (IFFT) converter 140, and a truncation and normalization block 150.

Referring to FIGS. 3A-3B, in some embodiments, the neural network 120 receives the frequency autocorrelation of a precoded channel at its input, and produces an estimated frequency autocorrelation at the output but with no precoding. In other words, the neural network 120 effectively strips the precoding from the channel PDP for a particular bundle. After post-processing, which is performed by the filter 130, the IFFT converter 140, and the truncation and normalization block 150, the estimated frequency autocorrelation of one bundle/slot is used as the input to the neural network 120 for the subsequent bundle/slot. As such the estimated channel PDP may become more refined and accurate (e.g., closer to the actual PDP) as the neural network 120 sequentially processes the bundles in the received signal. This may be due to the fact that, in practice, the PDP may not change much from one time slot to the next. As such, the channel estimator 100 may use the information from a previous time slot/bundle to enhance the calculations for the current slot/bundle.

The input size of a neural network 120 is fixed to be the same as a fast fourier transform (FFT) size. Here, the FFT size may represent the number of pins in the analysis window of the frequency spectrum. This allows a single network to cover all resource block configurations allocated for PDSCH and DMRS, for examples, up to 273 resource blocks (as in the example of Table 1). Sizing the neural network input to be the same as the FFT size prevents the need to design multiple networks, each corresponding to a single resource block size. This may be particularly desirable in that the channel estimator 100 (e.g., the channel estimator 100) may not be aware of the frequency resource allocation at the transmitter 10, and is thus sized to accommodate different frequency resource allocation at the transmitter 10.

Thus, according to some embodiments, in order to maintain the same size of input features, the edge expander 110 expands the measured autocorrelation to the FFT size by using the edge expansion. In some embodiments, the edge expander 110 interpolates signals (e.g., via linear interpolation) with an expansion matrix of $$A = \begin{bmatrix} a_2 & 0_{(N_f-N_d)/2 \times (N_d-2)} & b_1 \\ & I_{r_f(k)} & \\ a_1 & 0_{(N_f-N_d)/2 \times (N_d-2)} & b_2 \end{bmatrix} \quad \text{(Eq. 1)}$$

where $$a_1 = \frac{1}{N_f - N_d + 1}[1, 2, \ldots, (N_f - N_d)/2]^T \quad \text{(Eq. 12)}$$

$$a_2 = \frac{1}{N_f - N_d + 1}\left[\frac{N_f - N_d}{2} + 1, \ldots, (N_f - N_d)\right]^T \quad \text{(Eq. 13)}$$

$$b_1 = a_1\left[\left(N_f - \frac{N_d}{2}\right):1\right] \quad \text{(Eq. 14)}$$

$$b_2 = a_2\left[\left(N_f - \frac{N_d}{2}\right):1\right] \quad \text{(Eq. 15)}$$

where $N_f$ is the size of FFT, $N_d$ is the size of the measured/calculated autocorrelation (also referred to as the initial frequency autocorrelation) $\bar{r}_{f,i}(k)$. The expanded frequency autocorrelation may then be expressed as $$\tilde{r}_{f,i}(k) = A\bar{r}_f(k) \quad \text{(Eq. 16)}$$

where $\bar{r}_{f,i}(k)$ is defined in Equation 22 below.

However, embodiments of the present invention are not limited to the above interpolation, and any suitable expansion/interpolation technique may be employed to arrive at the expanded frequency autocorrelation based on the measured autocorrelation.

According to some embodiments, the channel estimator 100 utilizes the symmetric property of autocorrelation to remove duplicated information from the neural network 120. Thus, in some embodiments, the channel estimator 100 provides half of the expanded frequency autocorrelation values $\tilde{r}_f(k)$ to the neural network 120 (as shown in FIG. 3B) and only the corresponding values for the channel autocorrelation are computed by the neural network. The other half of the estimated frequency autocorrelation may be calculated by using:

$$\hat{r}_{f,o}(k) = \hat{r}_{f,o}(-k)^* \quad \text{(Eq. 17)}$$

That is, one half of the estimated channel autocorrelation may be calculated as the complex conjugate of the other half. Accordingly, the output of the neural network 120 may be restored to a full size of FFT from a half-size FFT at the input of the neural network 120. Performing inference frequency autocorrelation values significantly reduces the computational load on the neural network 120 and improved inference performance.

According to some embodiments, the filter 130, the IFFT converter 140, and the truncation and normalization block 150 apply post processing to the output of the neural network 120 for further stabilization. In some embodiments, the filter 130 applies a low-pass filter to the neural network output, $\hat{r}_f(k)$, which is the estimated autocorrelation of unprecoded channels to generate a refined frequency autocorrelation $\tilde{\tilde{r}}_{fi}[k]$. The low-pass filter may be a moving average over frequency expressed as $$\tilde{\tilde{r}}_f[k] = \frac{1}{2n+1}\sum_{i=k-n}^{k+n} \hat{r}_f[i] \quad \text{(Eq. 18)}$$

where $2n+1$ is the order of moving average.

Figure 4B:
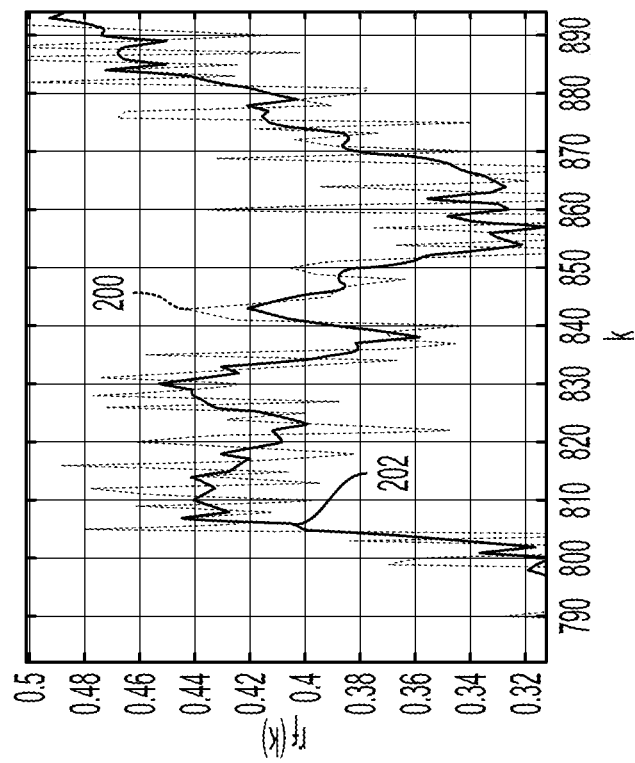
FIGS. 4A-4B illustrate plots of the estimated autocorrelation that is output from the neural network and the refined autocorrelation produced by a filter, according to some embodiments of the present disclosure.
Figure 4A:
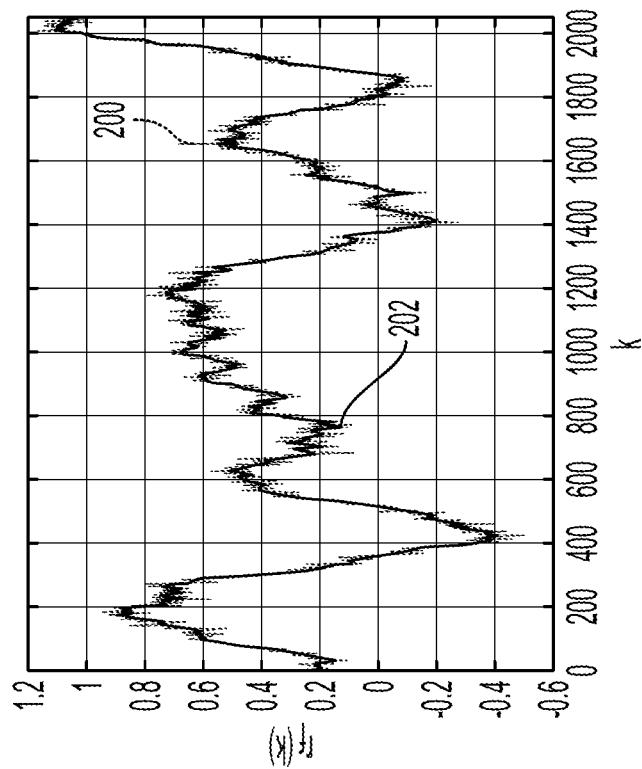

FIGS. 4A-4B illustrate plots of the estimated autocorrelation $\hat{r}_f$ that is output from the neural network 120 and the refined autocorrelation $\tilde{\tilde{r}}_f$ produced by the filter 130, where $n=2$, according to some embodiments of the present disclosure. In FIG. 4B, the plot is enlarged relative to FIG. 4A to better illustrate the smoothness of the refined autocorrelation $\tilde{\tilde{r}}_f$. In FIGS. 4A-4B, curve 200 represents the estimated autocorrelation $\hat{r}_f$ and the curve 202 represents the refined autocorrelation $\tilde{\tilde{r}}_f$.

According to some embodiments, the IFFT converter 140 converts the refined frequency autocorrelation into the estimated PDP (i.e., the estimated $P_i$ values in Equation 6) by performing an IFFT operation. The truncation and normalization block 150 further refines the estimated PDP in the time domain. In some embodiments, the truncation and normalization block 150 truncates/prunes the estimated PDP to the length of the maximum delay spread L and normalizes the estimated PDP to a unit power to satisfy the condition of Equation 7. The PDP estimation is then is given by $$\bar{P}_k = \frac{\tilde{P}_k}{\Sigma_i \tilde{P}_i} \quad \text{(Eq. 19)}$$

where $\tilde{P}_k$ is the power value at each tap, k, derived from the output of the neural network 120. As such, the truncation and normalization block 150 stabilizes the PDP estimation $\bar{P}_k$.

Figure 5B:
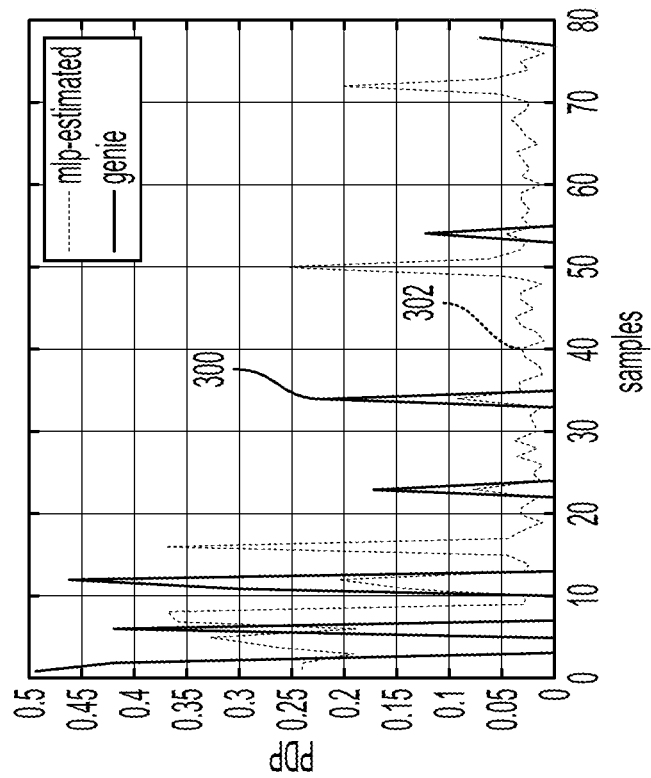
FIG. 5A-5B compare the genie power delay profile (PDP) values with estimated ones, according to some embodiments of the present disclosure.
Figure 5A:
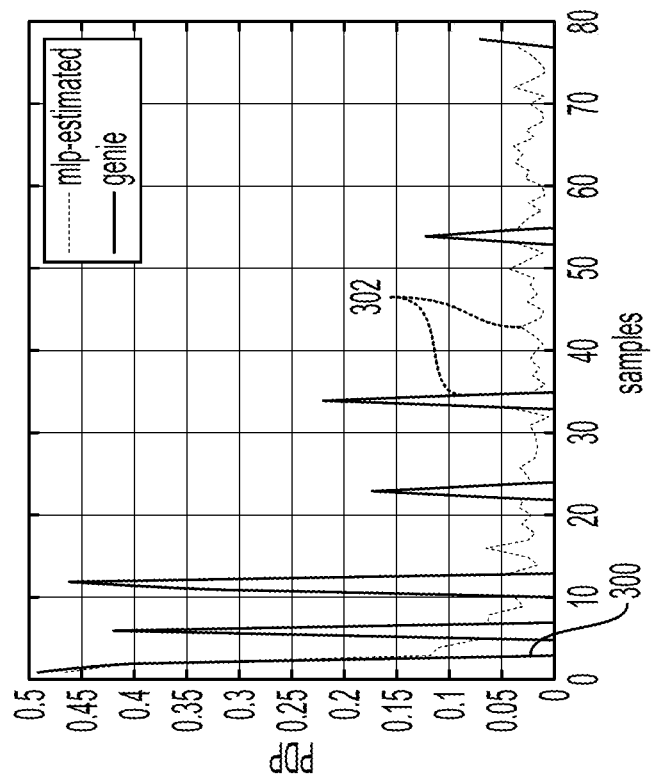

FIG. 5A-5B compare the genie (i.e., ideal) PDP values with the estimated ones $\bar{P}_k$, according to some embodiments of the present disclosure. FIG. 5A and FIG. 5B illustrate scenarios with 106 and 2 resource blocks, respectively. Therefore, as the number of resource blocks in the received signal increases, the estimated PDP values $\bar{P}_k$ become better approximations of the ideal PDP values.

In some embodiments, the NBCE 160 generates the frequency autocorrelation function $r_f(\ )$ by performing an FFT operation on the refined PDP estimate according to Equation 6.

According to some embodiments, the NBCE 160 further uses the frequency autocorrelation function $r_f(\ )$ generated for the current bundle/time slot to calculate the generate the neural network input for the subsequent/next bundle/time slot. In some embodiments, the NBCE 160 uses the calculated frequency autocorrelation function $r_f(\ )$ together with the time autocorrelation function $r_t(\ )$ (as, e.g., determined by Equation 4 or 5) to determine the channel autocorrelation $R_{h,h}$ via Equation 3, which is used to compute the channel autocorrelations $R_{hp}$ and $R_{pp}$. The NBCE 160 then calculates the estimated channel input response $\hat{h}$ using Equation 2.

According to some embodiments, the NBCE 160 then proceeds to calculate the frequency autocorrelation for the subsequent slot/bundle by using $$\hat{r}_{r,s,l}(k) = \Sigma_n \hat{h}_{r,s,l}(n)^* \hat{h}_{r,s,l}(n+k) \quad \text{(Eq. 20)}$$

$$\hat{r}_{r,s,l}(k) = \frac{\hat{r}_{r,s,l}(k)}{\hat{r}_{r,s,l}(0)} \quad \text{(Eq. 21)}$$

$$\bar{r}_f(k) = \frac{1}{N_s N_r N_l} \Sigma_s \Sigma_r \Sigma_l \hat{r}_{r,s,l}(k) \quad \text{(Eq. 22)}$$

where s is a symbol index within the slot, r is the antenna index of the receiver 30, l is the layer index assigned to the PDSCH and DMRS ports, and n is the resource element (RE) index. As $\bar{r}_f(k)$ is normalized (Equation 21), the maximum value is set to be at the middle of the vector. In some examples, the length of $\bar{r}_f(k)$ may vary depending on the number of resource blocks (RBs) assigned to the channel estimator 100 at each slot.

According to some embodiments, the channel estimator 100 (e.g., the NBCE 160) uses a uniform PDP in calculating the channel autocorrelation $r_f(\ )$ for the very first slot being analyzed by the neural network 120 in a data transmission.

In some embodiments, rather than rely on the channel autocorrelation $r_f(\ )$ from only the previous slot, the channel estimator 100 computes the autocorrelation over multiple past slots and averages them prior to injecting the averaged autocorrelation to the neural network 120.

According to some embodiments, the neural network 120 utilizes a model that correlates a plurality of frequency autocorrelations of precoded channel across bundles with a plurality of frequency autocorrelations without precoding. By utilizing the model and a supervised machine learning algorithm, such as a one of various known regression or back propagation algorithms, the neural network 120 estimates the autocorrelation $\tilde{r}_f$, which is the estimated frequency autocorrelation of an unprecoded channel for a given bundle. Here, the unprecoded channel refers to an estimate of the precoded channel absent (e.g., stripped of or without) precoding.

According to some embodiments, the neural network 120 (e.g., the deep neural network) may be a specialized AI or a general AI and is trained using training data (e.g., precoded and non-coded frequency autocorrelations) and an algorithm, such as a back-propagation algorithm.

The neural network 120 may include a set of weights for each of the parameters of a linear regression model, or the neural network 120 may include a set of weights for connections between the neurons of a trained neural network. In some embodiments, frequency autocorrelation functions $r_f()$ of a precoded channel across bundles are supplied to the neural network 120 as values to the input layer of the neural network 120, and the values (or a set of intermediate values) are forward propagated through the neural network 120 to generate an output, where the outputs are estimated autocorrelations $\tilde{r}_f$ of the channel without precoding.

In an example of training, 3 different types of precoding with a bundle of 2 resource blocks such as bypass (i.e., identity), random, and PMI (precoding matrix indicator)-based precoding. Under the configuration specified to generate samples, genie PDP per channel may be also be used to calculate $R_{pp}$ and $R_{hp}$ within a bundle. Thus, a pair of samples, i.e., frequency autocorrelation of precoded channels, and labels, i.e., frequency autocorrelation of unprecoded channels reversely computed from genie PDP, may be collected via simulation.

The maximum number of resource blocks (RBs) per subcarriers may be allocated to generate data samples, rather than all numbers of RBs per RB subcarriers. As stated, using the edge expansion, the input to the neural network 120 is maintained to be the size of FFT. For example, when a subcarrier spacing of 15 kHz is used at a channel bandwidth of 20 MHz, the maximum configurable number of RBs in a radio is 106. Similarly, with a subcarrier spacing of 30 kHz, 273 RBs can be allocated over a channel bandwidth of 100 MHz, as specified in Table 1.

Figure 6A:
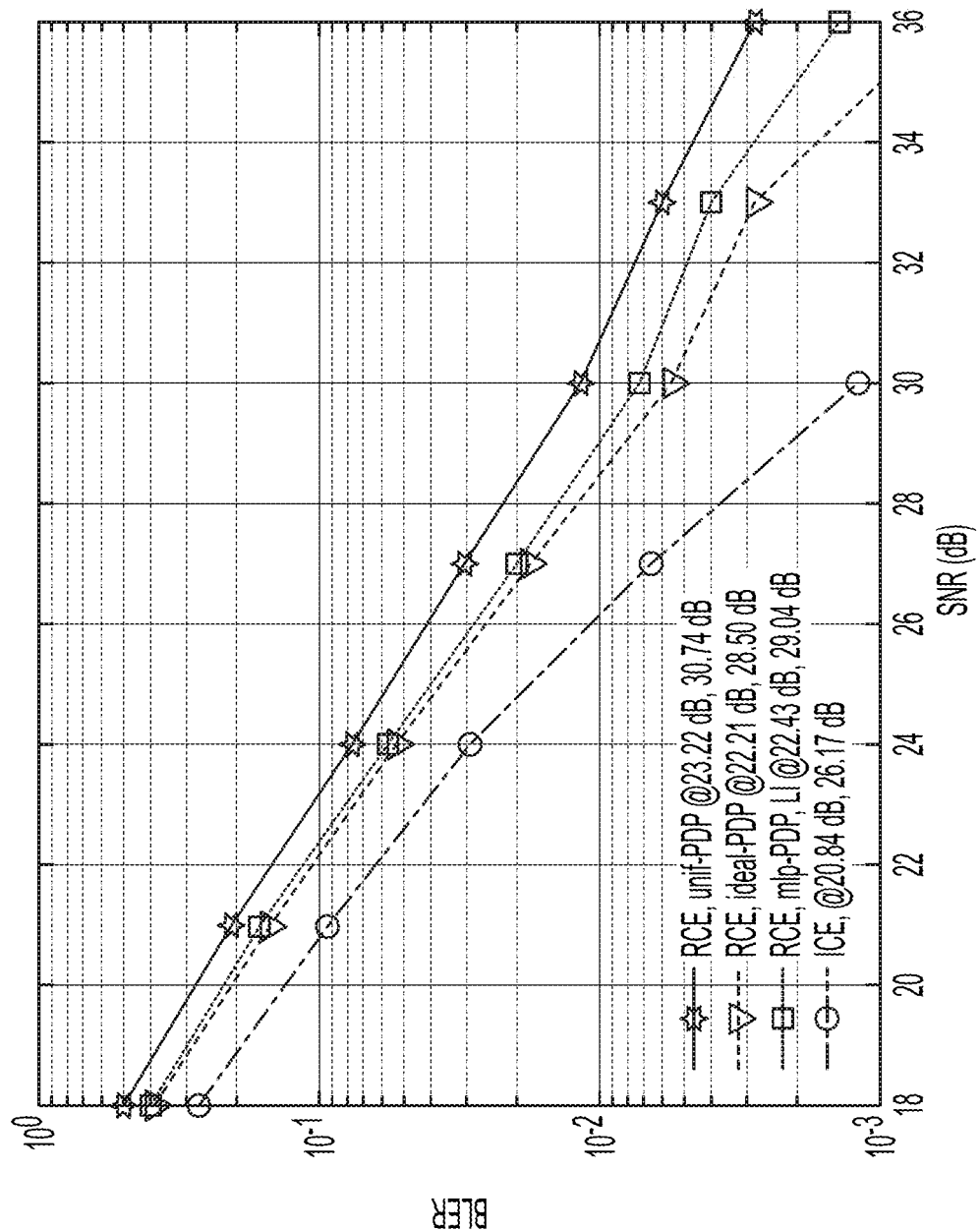
FIGS. 6A-6B illustrate the block error rate (BLER) versus signal to noise ratio (SNR) performance gain of the channel estimator 100 for a rank 2 extended vehicular A model (EVA) channel, according to some example embodiments of the present disclosure.
Figure 6B:
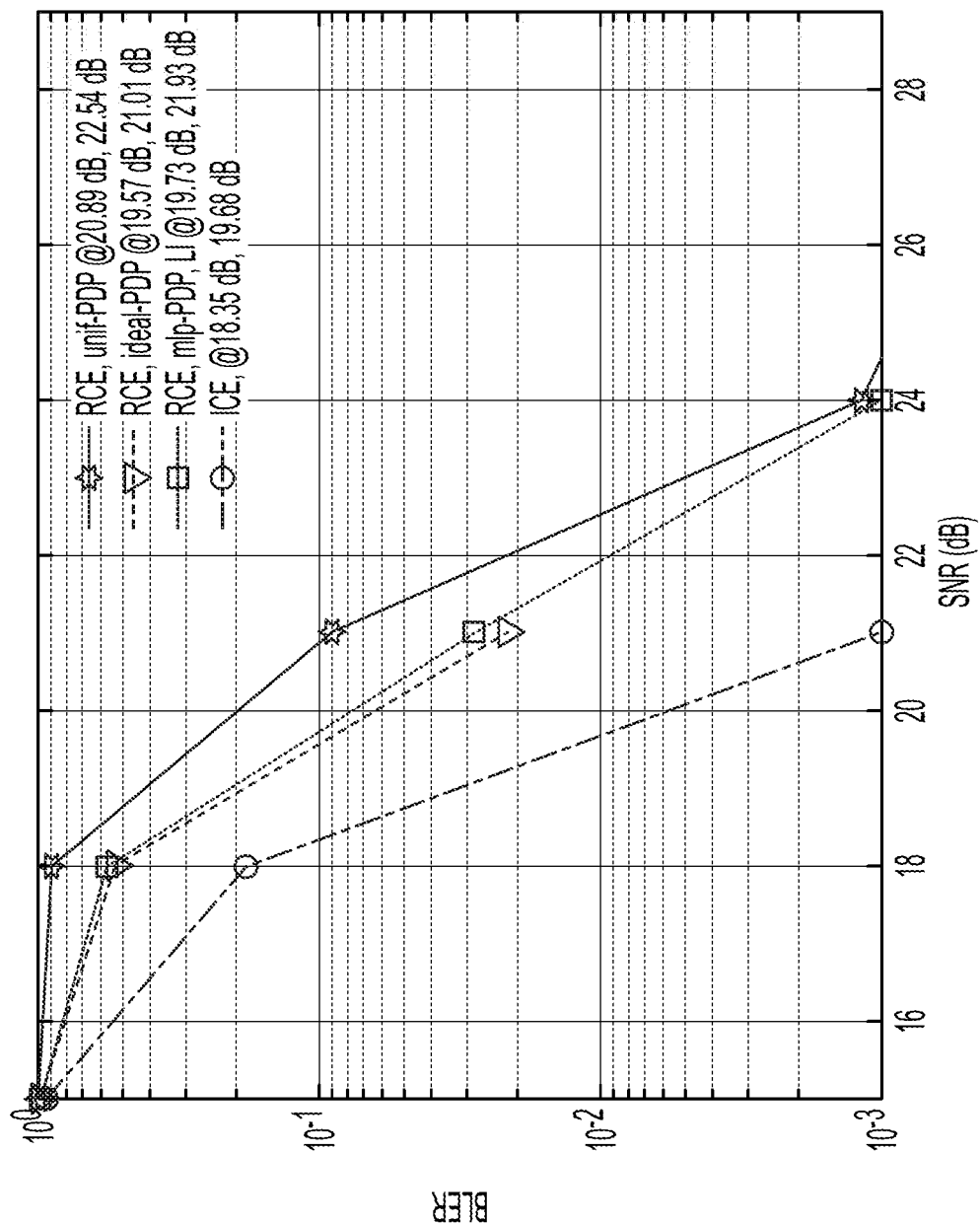

FIGS. 6A-6B illustrate the block error rate (BLER) versus signal to noise ratio (SNR) performance gain of the channel estimator 100 for a rank 2 extended vehicular A model (EVA) channel, according to some example embodiments of the present disclosure. FIGS. 6A-6B compare the NBCE with supervised learning with 3 reference plots corresponding to ideal CE, uniform PDP and ideal PDP. Here, the legend, 'mlp-PDP', denotes the NBCE with PDP estimation. As shown the BLER of channel estimator 100 is very close to that for ideal PDP at either a single bundle (e.g., FIG. 6A) or the full allocation of resources (e.g., FIG. 6B).

As described above, the channel estimator 100 estimates the power delay profile (PDP), that is, the $P_i$ values, in Equation 6 by using frequency autocorrelation of PDSCH combined with DMRS in the previous slot via neural networks and finally enhances the error of channel estimation at the current slot.

As provided above, the channel estimator 100 according to some embodiments aims to estimate PDP as close to ideal as possible. However, embodiments of the present invention are not limited thereto.

Given the assumption that the channel distribution follows a wide-sense stationary uncorrelated scattering (WS-SUS) model and due to the imperfectness of NBCE e.g., due to estimation error and background noise), the ideal PDP values may not guarantee the optimization (e.g., minimization) of the block error rate (BLER). As a result, according to some embodiments, the channel estimation is performed in such a way as to minimize the mean square errors (MSE) of channel estimation, which may lead to the reduction (e.g., minimization) of BLER.

According to some examples, NBCE PDP estimation is formulated to be a one-step markov decision process (MDP). That is, the action at the ith time slot does not impact the state at the (i+1)th slot. The action is the receiver's PDP estimation per slot and the state is solely associated with channels. Therefore, the one-step MDP is modeled to terminate a trajectory after a single time step is proceeded with a reward.

The MDP framework includes states, actions, and rewards. According to some embodiments, a state denotes frequency autocorrelation of channels, each of which may be precoded per bundle. As precoding matrices used by the transmitter 10 are transparent to receiver 30, the frequency autocorrelation at each slot is computed by using the estimated channels combined with the precoding at the previous slot as per Equations 20-22.

Figure 7:
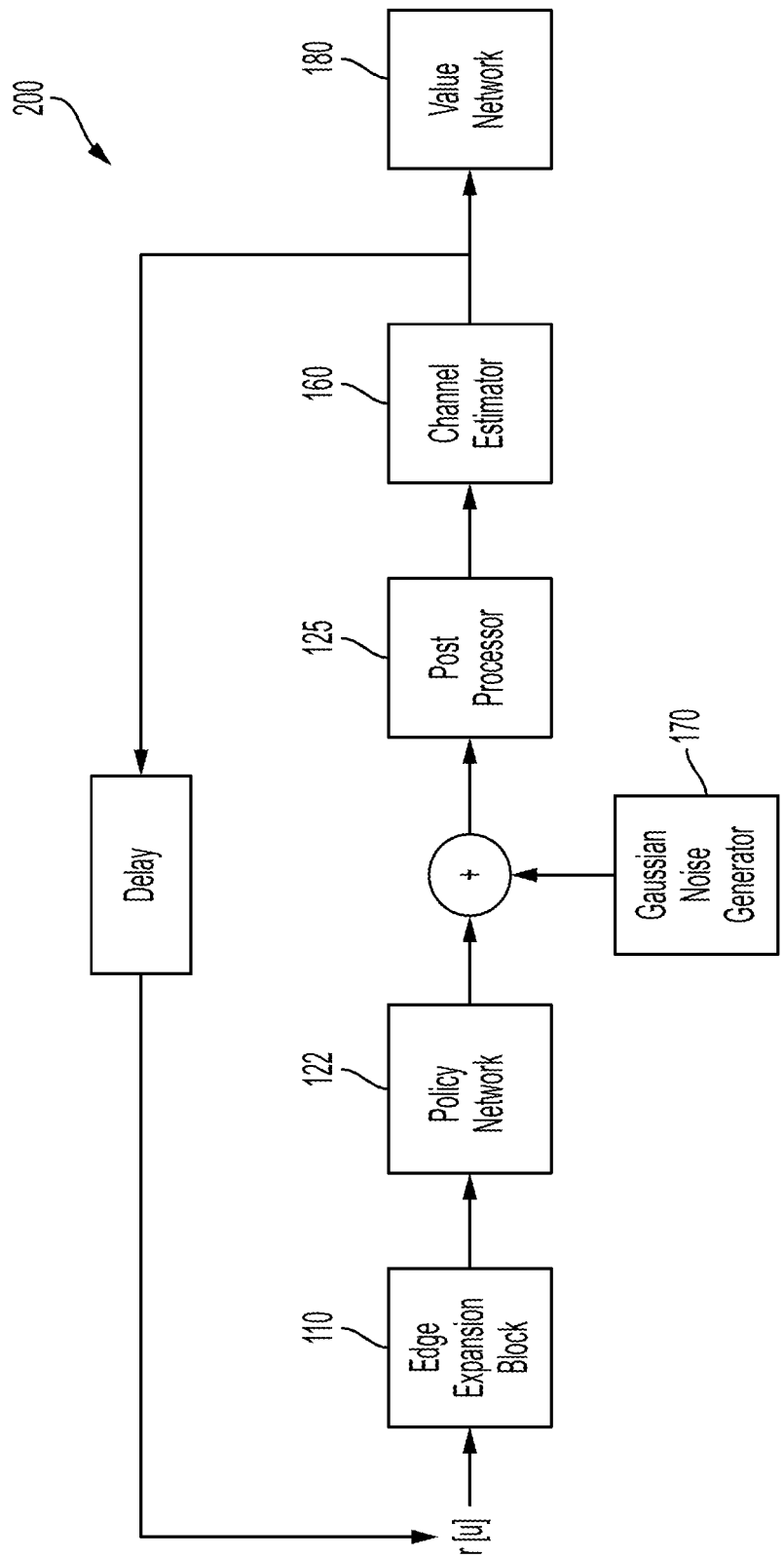
FIG. 7 is a block diagram of a channel estimator utilizing a policy network trained with an advantage actor critic (A2C) method, according to some embodiments of the present disclosure.

FIG. 7 is a block diagram of the channel estimator 200 utilizing a policy network trained with an advantage actor critic (A2C) method, according to some embodiments of the present disclosure.

According to some embodiments, the edge expander 110, the post-processor 125, and the narrowband channel estimator (NBCE) 160 of the channel estimator 200 are the same as the corresponding components of the channel estimator 100 of FIGS. 3A-3B. As such, the policy network 122 receives the same input $\tilde{r}_{f,i}(k)$ as the neural network 120, and produces a frequency autocorrelation function $\tilde{r}_f(k)$ at the output, which is similar to the output of the neural network 120. However, in some embodiments, the policy network 122 is trained to produce a frequency autocorrelation $\tilde{r}_f(k)$ of an unprecoded channel that can generate a PDP that may not be ideal, but reduces (e.g., minimizes) the BLER of the receiver 30.

In some embodiments, the channel estimator 200 includes a gaussian noise generator 170 for adding a gaussian noise to the output of the policy network 122, and a value network 180 for evaluating the output of the policy network 122 and correcting the coefficients or neural weights of the policy network 122 to reduce (e.g., minimizes) the overall BLER of the receiver 30. In some examples, the gaussian noise may have a mean of zero and a preset variance (e.g., a small fixed variance), and may convert the discrete action space of the policy network to a continuous action space. The policy network 122 takes both real and imaginary elements of $\tilde{r}_{f,i}(k)$ to produce an action with gaussian noise induced from a gaussian noise generator 170, which is the frequency autocorrelation $\tilde{r}_f(k)$ of estimated unprecoded channels.

In some embodiments, the value network 180 receives the state (i.e., the estimated frequency autocorrelation $\bar{r}_f(k)$ output by the NBCE 160) and produces a corresponding reward $\hat{V}_\varnothing^\pi$. In some embodiments, the reward is a negative mean square error of channel estimation against ideal channel values in dB. The predicted reward $\hat{V}_\varnothing^\pi$ may be the reward of forward propagation at the value network 180.

Here, the policy network 122 is referred to as the actor, and the value network 180 as the critic that measures how good or bad the actions taken by the actor are.

In some examples, a pair of state and reward is sampled for training in a value network with multiple random seeds (e.g., 20 random seeds). The network with the lowest loss function is selected as a value network 180. The value network 180 may be a multi-layer perceptron. According to some examples, the value network 180 has a single hidden layer with 128 nodes. The sigmoid function may be used at the activation layer of the value network 180 and the output layer of the value network 180 may be bypassed without a specific function. The loss function may be designed to reduce (e.g., minimize) the mean square error (MSE).

In some embodiment, after the value network 180 calculates the reward, the channel estimator 200 computes the advantage which may be expressed as:

$$\hat{A}^\pi(s_i,a_i)=r(s_i,a_i)-\hat{V}_\varnothing^\pi(s_i) \quad \text{(Eq. 23)}$$

where $r(s_i, a_i)$ is the instantaneous reward caused by the action $a_i$ at state $s_i$, $\hat{V}_\varnothing^\pi(s_i)$ is the predicted total reward of forward propagation at the output of the value network 180, and i is the slot index. The advantage indicates the improvement in expected rewards (relative to the average state) if action $a_i$ is taken by the policy network 122 at state $s_i$. In other words, if the advantage is positive, the gradient is moved in that direction, and if negative, the gradient is moved in the opposite direction. The channel estimator 200 then calculates the objective gradient $$\nabla_\theta J(\theta)=\Sigma_{t=0}^{T-1}\nabla_\theta \log \pi_\theta(a_t|s_t)\hat{A}^\pi(s_t,a_t) \quad \text{(Eq. 24)}$$

where $\nabla_\theta J(\theta)$ is the gradient of the objective $J(\theta)$, $\theta$ represents the coefficients of the policy network 122, t represents a time index increasing from 0 to T represents the number of time steps, and $\pi_\theta(a_t/s_t)$ represents the probability function of the policy network 122 for determining the action $a_t$ when given a state $s_t$. The probability function $\pi_\theta(a_t/s_t)$ of the policy network 122 may be trained through supervised learning. In some examples, the one-step MDP is modeled to terminate a trajectory after a single time step, that is, T=1.

According to some embodiments, the channel estimator 200 then updates the policy (e.g., updates the coefficients of the policy network 170) via back propagation using the policy gradient $\nabla_\theta J(\theta)$ by substituting the policy coefficients (or network coefficients) $\theta$ with $\theta+\alpha\nabla_\theta J(\theta)$, where $\alpha$ is a small coefficient, which may be 0.05, for example.

According to some embodiments, during the training phase of the policy network 122, the channel estimator repeatedly performs the steps of determining an action by the policy network 122 given a state, determining a reward for the action and state by the value network 180, evaluating the advantage via one-step reinforcement learning, calculating the objective gradient, and updating the policy coefficients via back propagation. This loop may continue until the improvement converges or until a predetermined threshold is met.

According to some embodiments, the value network 180 may be a specialized AI or a general AI and is trained using training data and an algorithm, such as a back-propagation algorithm.

The value network 180 may include a set of weights for each of the parameters of a linear regression model, or the value network 180 may include a set of weights for connections between the neurons of a trained neural network. In some embodiments, frequency autocorrelation functions of an unprecoded channel across bundles are supplied to the value network 180 as values to the input layer of the value network 180, and the values (or a set of intermediate values) are forward propagated through the value network 180 to generate an output, where the outputs are instantaneous reward caused by the actions taken by the policy network 122.

According to some embodiments, while the value network 180 is present in the channel estimator 200 for purpose of training the policy network 122, the value network 180 may be omitted from the channel estimator 200 during the inference phase when the channel estimator 200 is being used to perform channel estimation for incoming signals.

In some examples, the receiver 30 may be equipped with 2 or 4 receive antennas and the transmitter 10 transmits a signal with the same rank as the receive antennas. Here, the rank refers to the matrix rank (i.e., the number of columns in the matrix) of the channel input response $\hat{h}$. The number of resource blocks may be set to 106 over a channel bandwidth of 20 MHz.

In some examples, training may be performed with samples from all of extended pedestrian A model (EPA), extended vehicular A model (EVA), and extended typical urban model (ETA) channels, and each of the value and policy networks is covers all channels. The initial policy network 122 may be initially trained through supervised learning where all precoding options are sampled such as identity, random, and PMI-based precoding. The neural network may enable batch normalization for its training so that the input to the hidden layer has been normalized with zero mean and unit variance.

Figure 8A:
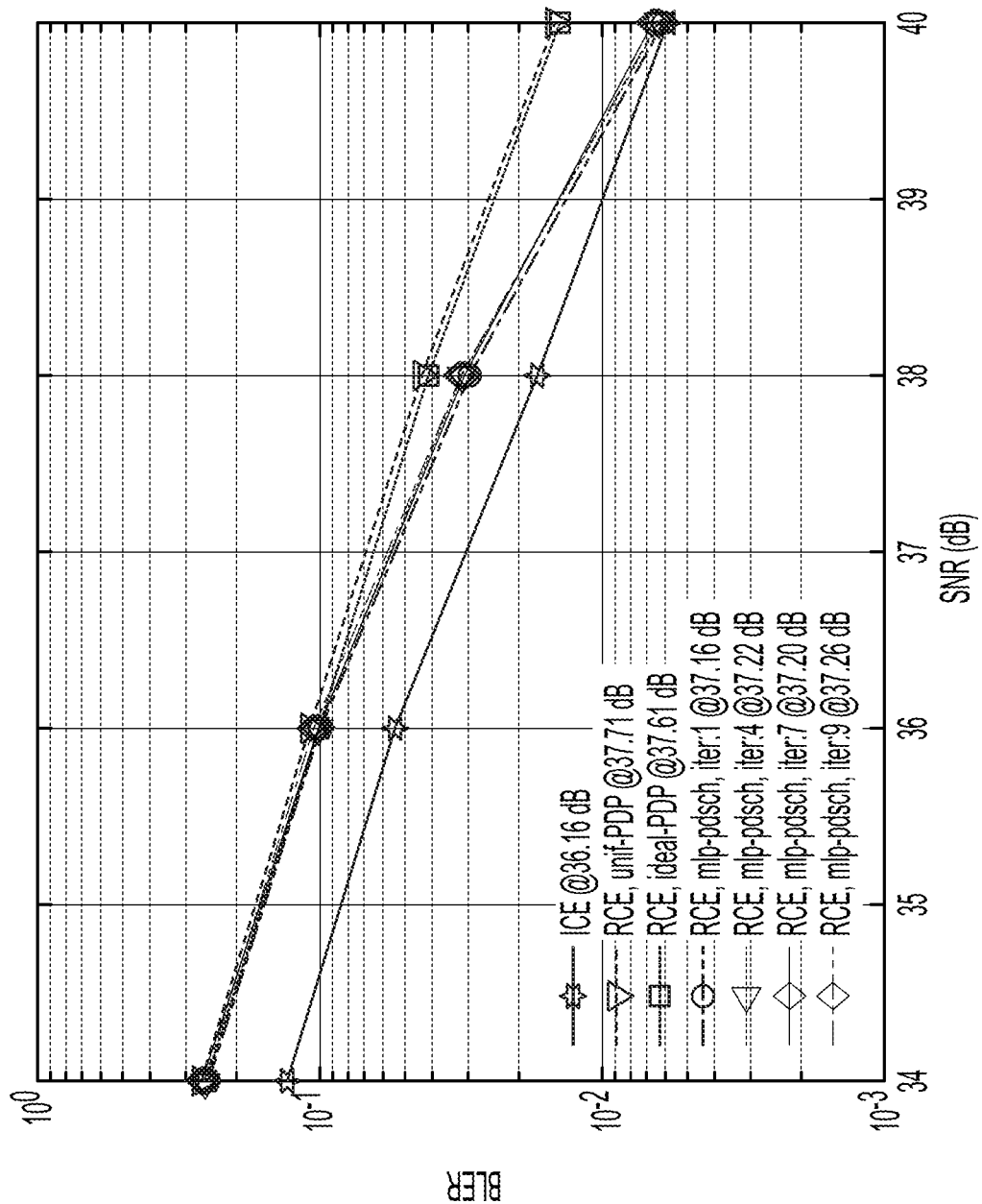
FIGS. 8A, 8B, and 8C illustrate the block error rate (BLER) versus signal to noise ratio (SNR) performance gain of the channel estimator for a rank 2 extended pedestrian A model (EPA) channel, EVA channel, and extended typical urban model (ETA) channel, respectively, according to some example embodiments of the present disclosure.
Figure 8B:
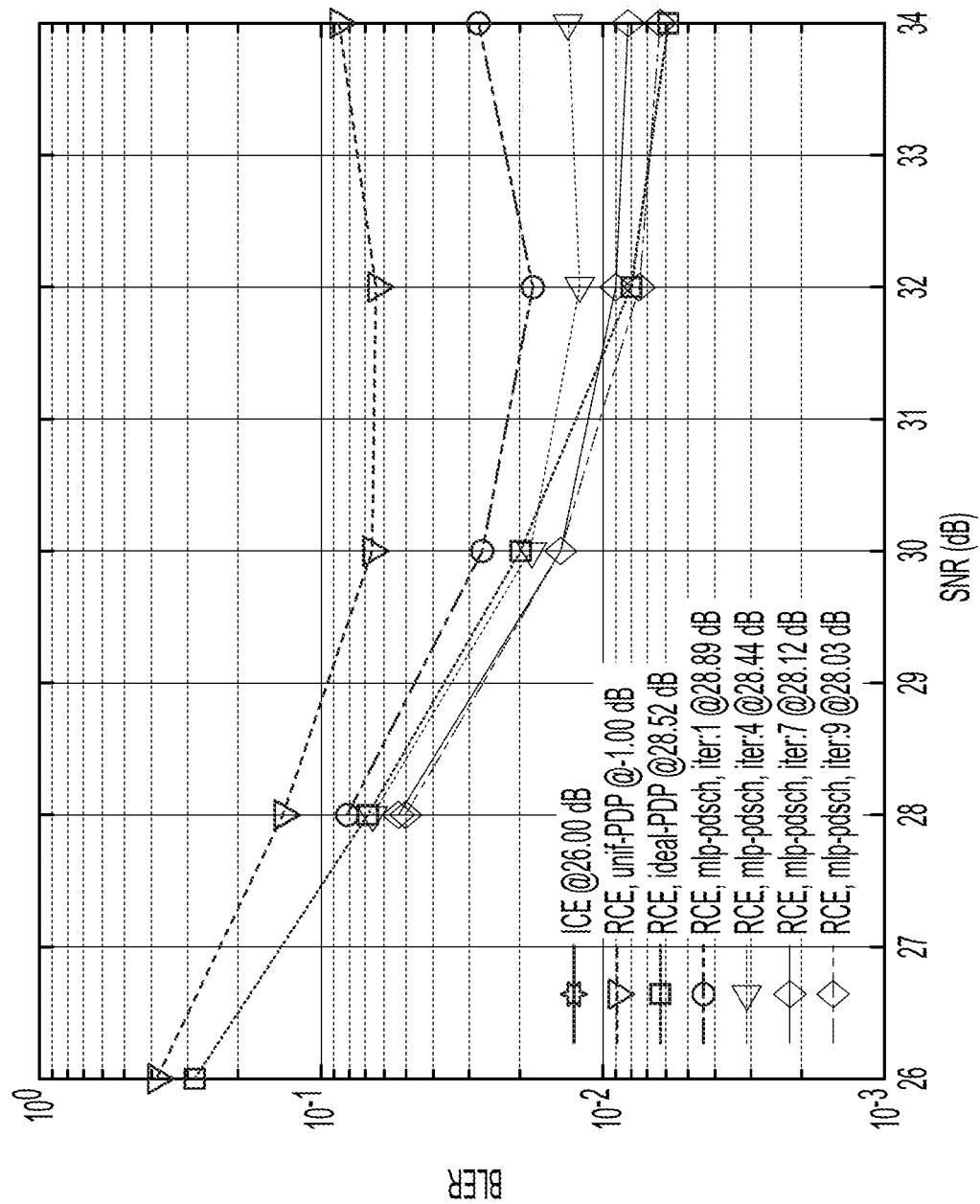
Figure 8C:
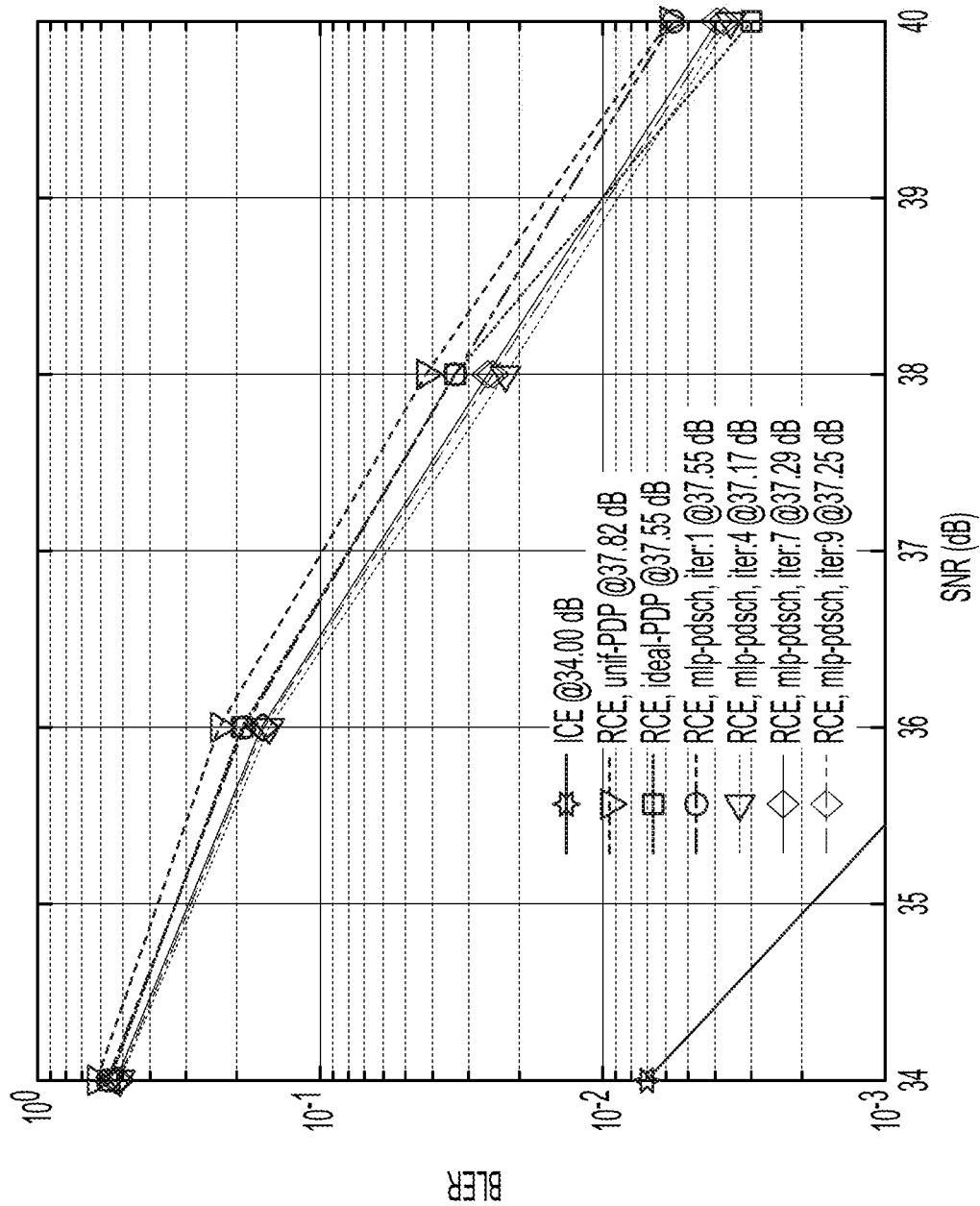
Figure 9A:
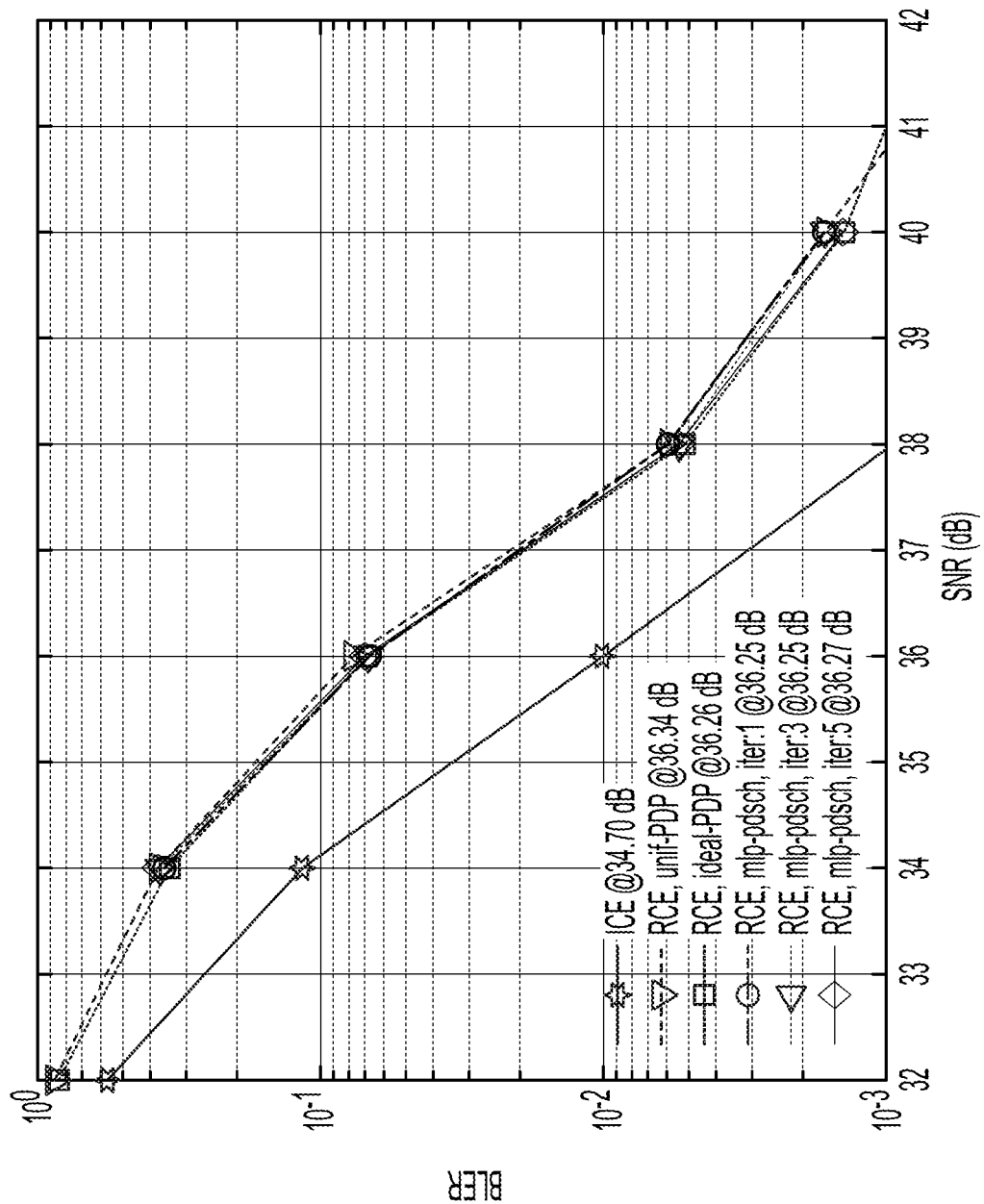
FIGS. 9A, 9B, and 9C illustrate the block error rate (BLER) versus signal to noise ratio (SNR) performance gain of the channel estimator for a rank 4 EPA channel, EVA channel, and ETA channel, respectively, according to some example embodiments of the present disclosure.
Figure 9B:
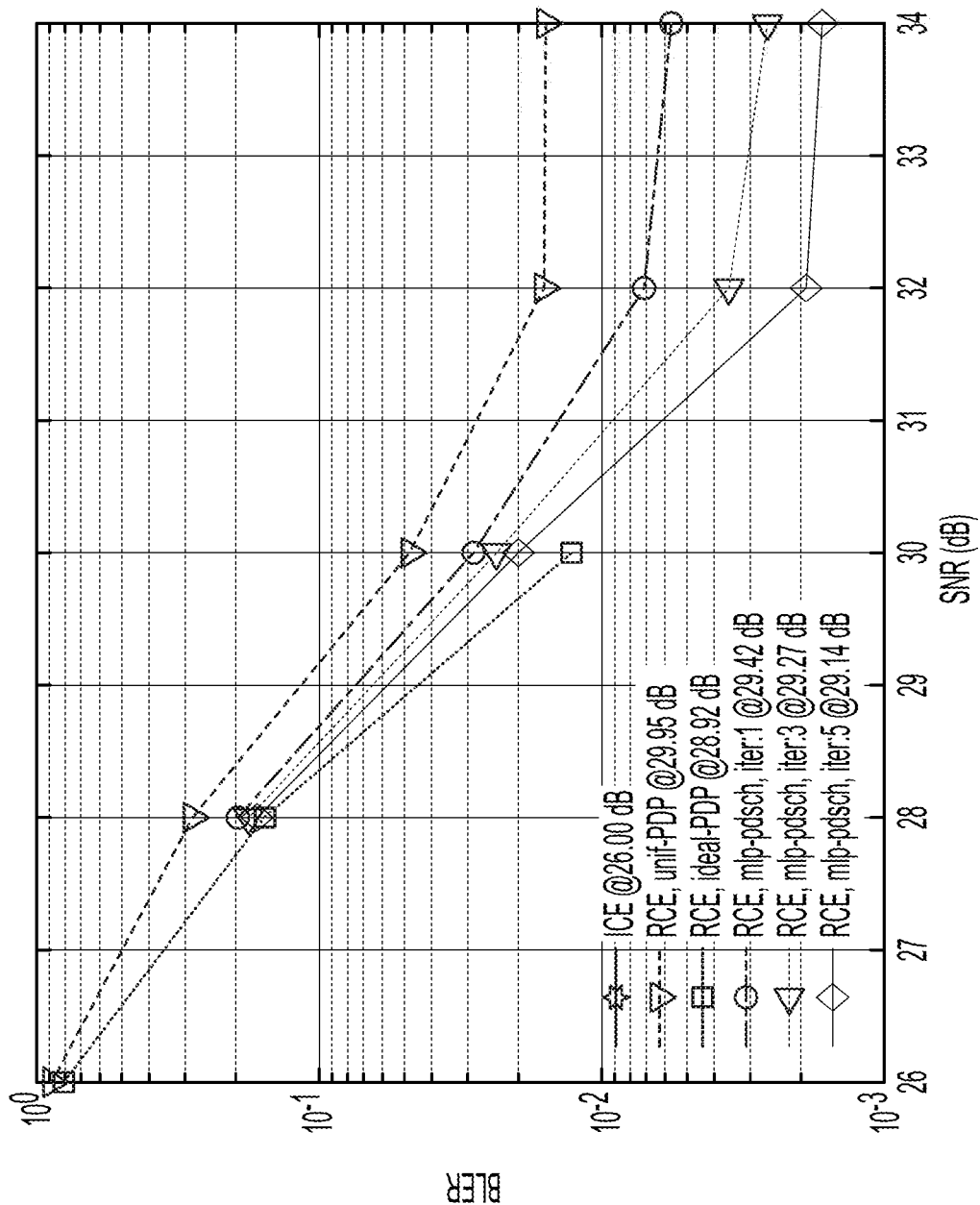
Figure 9C:
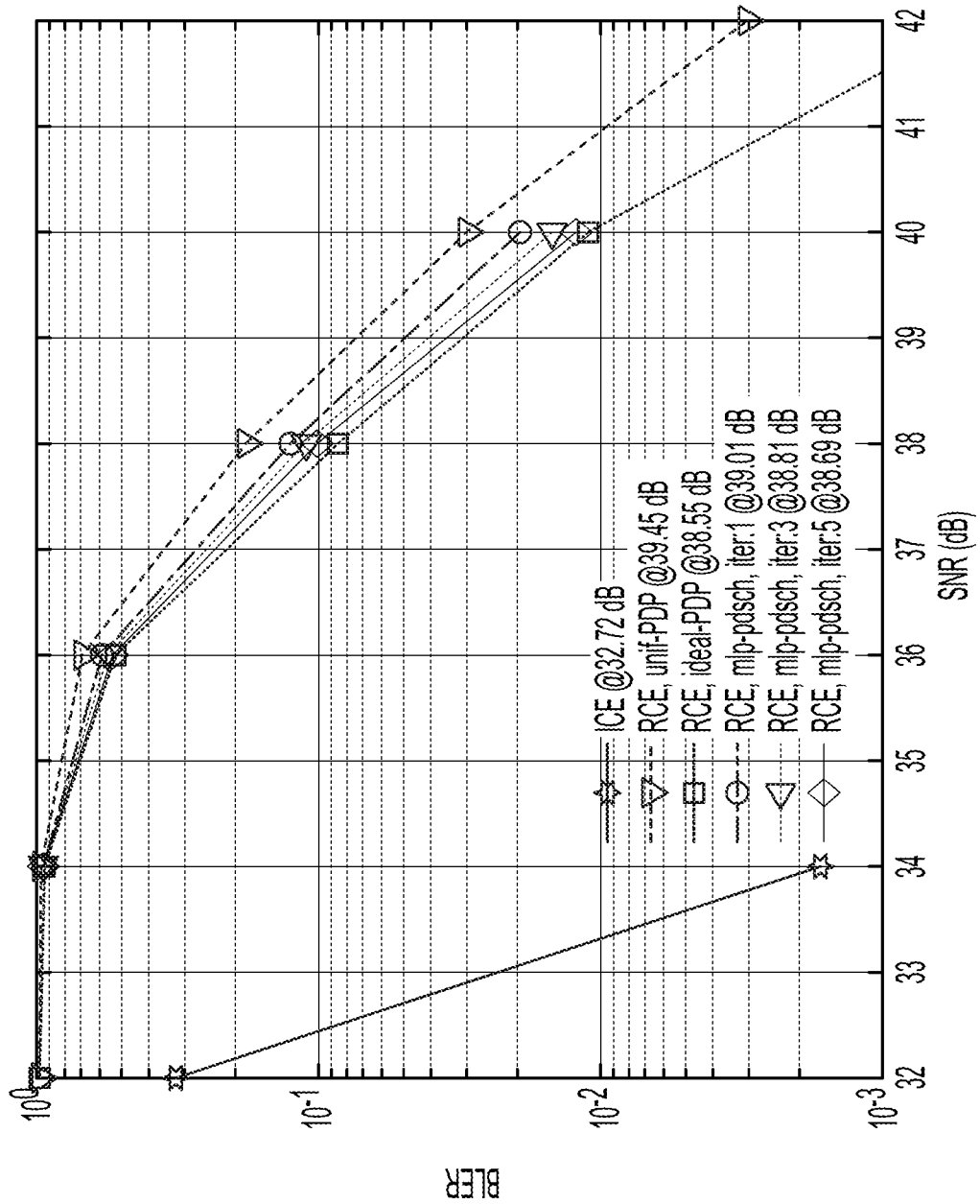

FIGS. 8A, 8B, and 8C illustrate the block error rate (BLER) versus signal to noise ratio (SNR) performance gain of the channel estimator 200 for a rank 2 EPA channel, EVA channel, and ETA channel, respectively, according to some example embodiments of the present disclosure. FIGS. 9A, 9B, and 9C illustrate the block error rate (BLER) versus signal to noise ratio (SNR) performance gain of the channel estimator 200 for a rank 4 EPA channel, EVA channel, and ETA channel, respectively, according to some example embodiments of the present disclosure.

The EPA, EVA, and ETU are multipath fading channel model delay profiles that represent a low, medium, and high delay spread environment, respectively. Given that an EPA channel has a relatively shorter delay spread (e.g., only up to 410 ns), there may be little room to improve PDP estimation as compared to the uniform or ideal PDP assumptions. However, as the maximum delay spread increases in EVA and ETU channels, the PDP estimation can vary much over the delay spread and the performance can be much affected. Hence, it can be further improved or rather degraded as well.

As illustrated in FIG. 8A/9A, the BLER v. SNR performance in an EPA channel is not much changed over iterations (i.e., iterations of the actor-critic training of the policy network 122). However, as shown in FIGS. 8B/9B and 8C/9C, the A2C training of the policy network 122 is indeed effective in improving the performance by maximizing the reward, i.e., minimizing the MSE of channel estimation over several interactions. In the examples of FIGS. 8B-8C and 9B-9C, it is observed that the A2C training of the policy network can even outperform the performance of ideal PDP. Further, as illustrated, a single network could be applicable to multiple different channel environments as well.

Table 2 provides the performance gain of channel estimation using A2C against the uniform PDP assumption for NBCE. Channel estimation using A2C may outperform channel estimation using supervised learning and may also outperform the scheme using ideal PDP. In other words, under the assumption of WSSUS, ideal PDP may not be optimal for NBCE.

TABLE 2

|        | EPA    | ETU     | EVA    |
|--------|--------|---------|--------|
| Rank 2 | 0.5 dB | >2.0 dB | 0.6 dB |
| Rank 4 | 0.3 dB | >1.7 dB | 0.5 dB |

As described above, according to some embodiments, the channel estimator 200 uses A2C to improve NBCE performance. While supervised learning is effective in estimating PDP that is close to ideal, even an ideal PDP may not guarantee a low block error rate in NBCE under the WSSUS model. Accordingly, the channel estimator 200 uses A2C to train a policy network by criticizing its policy by comparing with results from a value network. As such, the channel estimator using A2C reduces (e.g., minimizes) the MSE of channel estimation, which may lead to the performance enhancement in terms of BLER.

The operations performed by the constituent components of the transmitter 100 and the receiver 200 (e.g., by the channel estimator 100 and 200) may be performed by a "processing circuit" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

While the present invention has been illustrated and described with reference to the embodiments thereof, it will be apparent to those of ordinary skill in the art that various suitable changes in form and detail may be formed thereto without departing from the spirit and scope of the present invention, as defined by the following claims and equivalents thereof.

What is claimed is:

1. A method of channel estimation for a precoded channel, the method comprising:
    generating an initial frequency autocorrelation of the precoded channel for a current bundle of a received data transmission;
    generating an expanded frequency autocorrelation based on the initial frequency autocorrelation of the precoded channel;
    providing the expanded frequency autocorrelation to a neural network;
    generating, by the neural network, an estimated frequency autocorrelation of an unprecoded channel based on the expanded frequency autocorrelation; and
    generating an estimated power distribution profile of the unprecoded channel based on the estimated frequency autocorrelation.

2. The method of claim 1, wherein the current bundle comprises a plurality of resource blocks, each one of the resource blocks comprising a plurality of subcarriers.

3. The method of claim 1, wherein the unprecoded channel is an estimate of the precoded channel absent precoding.

4. The method of claim 1, wherein the generating the expanded frequency autocorrelation comprises:
    performing edge expansion on the initial frequency autocorrelation to expand a size of the estimate frequency autocorrelation to a fast fourier transform (FFT) size,
    wherein the FFT size is an input size of the neural network.

5. The method of claim 4, wherein the edge expansion comprises a linear interpolation of values of the initial frequency autocorrelation via an expansion matrix.

6. The method of claim 1, wherein the providing the expanded frequency autocorrelation to the neural network comprises:
    providing a first half of values of the expanded frequency autocorrelation to the neural network,
    wherein a second half of values of the expanded frequency autocorrelation are complex conjugates of the first half of values of the expanded frequency autocorrelation.

7. The method of claim 1, wherein the generating the estimated frequency autocorrelation by the neural network comprises:
    generating, by the neural network, at least some of values of the estimated frequency autocorrelation of the unprecoded channel based on the expanded frequency autocorrelation.

8. The method of claim 1, wherein the generating the estimated power distribution profile comprises:
  filtering the estimated frequency autocorrelation output by the neural network via a low pass filter to generate a refined autocorrelation of the unprecoded channel; and
  performing an inverse FFT (IFFT) operation on the refined autocorrelation to generate the estimated power distribution profile.

9. The method of claim 8, wherein the low pass filter is a moving average filter.

10. The method of claim 1, wherein the generating the initial frequency autocorrelation of the precoded channel for the current bundle comprises:
  generating a time autocorrelation for a previous bundle of the received data transmission;
  generating a previous frequency autocorrelation for the previous bundle based on a previous estimated power distribution profile;
  generating an estimated channel input response based on the time autocorrelation and the previous frequency autocorrelation; and
  generating the initial frequency autocorrelation of the precoded channel for the current bundle based on the estimated channel input response.

11. The method of claim 1, further comprising:
  generating a truncated estimated power distribution profile by truncating a size of the estimated power distribution profile to match a size of the initial frequency autocorrelation of the precoded channel.

12. The method of claim 11, further comprising:
  normalizing the truncated estimated power distribution profile to a unit power to generate a normalized estimated power distribution profile.

13. The method of claim 11, wherein the truncated estimated power distribution profile has a length of a maximum delay spread of the precoded channel.

14. A system for channel estimation of a precoded channel, the system comprising:
  a processor; and
  memory storing instructions that, when executed on the processor, cause the processor to perform:
    generating an initial frequency autocorrelation of the precoded channel for a current bundle of a received data transmission;
    generating an expanded frequency autocorrelation based on the initial frequency autocorrelation of the precoded channel;
    providing the expanded frequency autocorrelation to a neural network;
    generating, by the neural network, an estimated frequency autocorrelation of an unprecoded channel based on the expanded frequency autocorrelation; and
    generating an estimated power distribution profile of the unprecoded channel based on the estimated frequency autocorrelation.

15. A method of channel estimation for a precoded channel, the method comprising:
  generating an initial frequency autocorrelation of the precoded channel for a current bundle of a received data transmission;
  providing the initial frequency autocorrelation to a policy network;
  generating, by the policy network, an estimated frequency autocorrelation of an unprecoded channel based on the initial frequency autocorrelation;
  determining, by a value network, an instantaneous reward based on the estimated frequency autocorrelation;
  determining an advantage based on the instantaneous reward and a predicted total reward of forward propagation at the value network; and
  updating a policy of the policy network based on the advantage via back propagation to reduce a block error rate.

16. The method of claim 15, wherein the updating the policy of the policy network comprises:
  determining a policy gradient based on the advantage; and
  updating coefficients of the policy network based on the policy gradient.

17. The method of claim 15, wherein the policy network and the value network are multi-layer perceptrons.

18. The method of claim 15, further comprising:
  adding gaussian noise to the estimated frequency autocorrelation to convert a discrete action space of the policy network to a continuous action space.

19. The method of claim 15, further comprising:
  generating an expanded frequency autocorrelation based on the initial frequency autocorrelation of the precoded channel,
  wherein the providing the initial frequency autocorrelation to the policy network comprises:
    providing the expanded frequency autocorrelation to the policy network, and
  wherein the generating the estimated frequency autocorrelation of the unprecoded channel is based on the expanded frequency autocorrelation.

20. The method of claim 15, further comprising:
  filtering the estimated frequency autocorrelation via a low pass filter to generate a refined autocorrelation of the unprecoded channel; and
  performing an inverse FFT (IFFT) operation on the refined autocorrelation to generate an estimated power distribution profile.

* * * * *